ered Kathryn United States Patent [19]

Strouse, Jr.

[11] Patent Number: 5,857,396
[45] Date of Patent: Jan. 12, 1999

[54] SLITTING MACHINE

[76] Inventor: Joseph M. Strouse, Jr., 8090 Danbury Dr., Mentor, Ohio 44060

[21] Appl. No.: 519,507

[22] Filed: Aug. 25, 1995

[51] Int. Cl.[6] ........................... B23D 19/04; B23D 25/12; B26D 01/24
[52] U.S. Cl. ............................... 83/502; 83/503; 83/676; 83/698.61; 83/699.61; 384/255; 384/272
[58] Field of Search ..................... 83/503, 507, 699.61, 83/698.41, 698.51, 344, 343, 345, 501, 502, 508.2, 498, 499, 698.61, 699.51, 425, 425.2, 495, 500, 504, 506, 676, 664; 384/255, 272, 556, 558

[56] References Cited

U.S. PATENT DOCUMENTS

| Re. 29,968 | 4/1979 | Geese et al. ........................ 403/15 X |
| 2,222,051 | 11/1940 | Tyrrell ................................ 83/503 X |
| 2,986,086 | 5/1961 | Siebke ............................... 384/255 X |
| 3,173,325 | 3/1965 | Narren et al. . |
| 3,364,803 | 1/1968 | Senftleben ......................... 83/503 X |
| 3,545,326 | 12/1970 | Madachy . |
| 4,026,176 | 5/1977 | Weiskopf . |
| 4,131,054 | 12/1978 | Johnson et al. ..................... 90/11 X |
| 4,333,616 | 6/1982 | Strouse . |
| 4,428,265 | 1/1984 | Bolton . |
| 4,551,032 | 11/1985 | Mottershead ...................... 354/556 X |
| 4,611,934 | 9/1986 | Piotrowski et al. ................ 384/556 X |
| 4,641,558 | 2/1987 | Hoffmann ....................... 83/698.61 X |
| 4,667,550 | 5/1987 | Eiting . |
| 4,805,506 | 2/1989 | Gosnell . |
| 4,922,778 | 5/1990 | Nagai . |
| 4,922,779 | 5/1990 | Fritz et al. . |
| 4,938,615 | 7/1990 | Baker .................................. 384/556 X |
| 5,029,461 | 7/1991 | Lawrence et al. ................. 384/556 X |
| 5,524,988 | 6/1996 | Cheung ............................. 384/556 X |

*Primary Examiner*—Rinaldi I. Rada
*Assistant Examiner*—Boyer Ashley
*Attorney, Agent, or Firm*—Renner, Otto, Boisselle & Sklar

[57] ABSTRACT

A slitting machine includes a pair of parallel arbors structured to support a plurality of cutting knives. The arbors are mounted to a head stock and tail stock on the slitting machine. The head stock and tail stock each rotatably support eccentrics which support the end portions of the arbors. Angular contact bearings, such as tapered roller bearings or ball bearings with inclined races, are positioned between the head stock and tail stock and the respective eccentrics and also within the eccentrics between the arbors and the eccentrics. Mechanisms are provided for providing an axial load across all of these bearings to eliminate play and so to accurately position the arbors so that cutting accuracy can be maintained. One such mechanism is a collet/piston supporting the operator's end of the arbors. The collet piston is received in a cylinder to which hydraulic pressure can be applied through a rotary coupling. When pressurized, the collet piston is forced onto a tapered end of the arbor, accurately positioning the arbor. At the same time, because the cylinder is mounted to the inclined bearings within the eccentric, the reaction force is transmitted through the angular contact bearings to the machine frame, precisely locating the arbors centrally of the bearings in which they are mounted. The collet piston may be made double acting so that it can assist in removing the arbor from the collet/piston. This permits self locking tapers to be used.

21 Claims, 11 Drawing Sheets

SLITTING MACHINE

FIELD OF THE INVENTION

The present invention relates to slitting machines and in particular to an improved slitting machine for use with thin webs of metal, for example, webs 0.010 inches in thickness or less.

BACKGROUND OF THE INVENTION

Slitting machines have long been used to slit webs of material into strips of various widths. Such machines are used to slit webs of metal to form strips that will become everything from razor blades to electric conductors for integrated circuit computer chips. Slitting machines have a pair of arbors on which are mounted opposing pairs of knives. The knives of each pair of cutters are positioned along the length of the arbors so that they shear the metal as it passes through the machine. Positioning of the knives is accomplished by placing each knife on the arbor and separating it from its neighbors with spacers of controlled width. The stack of knives and spacers on each arbor is held in place by a shoulder at one end of the arbor and a nut which compresses the stack against the shoulder from the other end of the arbor.

The position of the knives on each arbor is critical, since too wide a space between the opposing knives of each pair means that the metal strips will have burrs on the edges, while too narrow a space means that the cutters will interfere with each other or wear too rapidly. Also, having too wide of a space on one side and too narrow a space on the other side of a slit strip induces camber into it. The spacing for knives for thin materials is difficult to maintain accurately where a wide web of thin material is to be slit into narrow strips. For example, in slitting webs of metal 0.005 inches thick, such as might be used for contact strips in an integrated circuit computer chip, each knife must be positioned to within ±0.0005 of an inch. Since the web being slit may be two feet wide or more and the strips being cut may be one half inch wide or less, there are a large number of knives and spacers. In order to maintain the position of each knife with the desired accuracy (±0.0005 inches) it is necessary to machine the spacers and knives to an accuracy of ±0.000040 inches (forty millionths of an inch). If such precision is not maintained, then the errors in positioning each knife cumulate across the width of the arbor to a degree that exceeds the necessary accuracy to produce a good finished product.

The need for accurate positioning has been recognized in the past, and various techniques have been used to achieve it. Precision machining operations have been used and special care in handling has been used in the manufacture and installation of the knives and spacers. This is costly and time consuming. However, even the most careful installation of precisely machined knives and spacers will not achieve the desired results if the arbors to which the knives and spacers are mounted are not accurately positioned with respect to each other. Thus it becomes a matter of importance for the arbors to be accurately positioned with respect to the machine's frame and so with respect to each other.

Any attempt to position the arbors accurately relative to each other begins with quality bearings to support the arbors and the various moving parts which surround them in the machine's frame. Included in such parts are eccentrics which support the bearings in which the arbors turn. These eccentrics are necessary to allow the arbors to be moved away from each other so that the knives can be installed on each arbor without interfering with the knives on the parallel arbor. Thus there are two sets of bearings which wear, those between the eccentrics and the machine frame, and those between the arbors and the eccentrics. As these wear, play increases, and the arbors' axial positions become less and less fixed. Precision bearings are not sufficient to eliminate wandering of the arbors because they wear and inevitably have some play which makes accurate positioning of the arbors difficult. One solution to this problem is illustrated in U.S. Pat. No. 4,667,550. There the axial wandering of the arbors is controlled by a feedback system that senses the relative position of the arbors and moves one arbor relative to the other arbor to correct for deviation from the desired location.

SUMMARY OF THE INVENTION

The present invention addresses the problems associated with prior art slitting machines by providing a slitting machine in which excess play in bearings supporting the arbors and eccentrics is substantially controlled so as to remain within acceptable limits. This is achieved by a collet/piston and cylinder arrangement that acts axially on the arbors. This arrangement is effective because the arbors are mounted in angular contact bearings such as tapered roller bearings and so the axial force applied to the arbors applies a preload to the angular contact bearings in which they are mounted and so eliminates or controls the axial and radial play.

The eccentrics may also be mounted in angular contact bearings. If this is done, then the same collet/piston and cylinder arrangement that eliminates play in the arbor-to-eccentric bearings also eliminates play in the eccentric-to-machine frame bearings. Alternatively, the eccentrics may each be supported by two sets of conventional, plane bearings, one set to receive axial loads, and another to receive radial loads. In such a case, the collet/piston and cylinder arrangement is effective to eliminate axial play in all the bearings and the radial play in the arbor-to-eccentrics bearings. However, radial play in the eccentrics-to-machine frame bearings remains. Accordingly, a second piston is mounted at each end of the upper arbor to act in a radial, downward direction on the eccentrics, pressing the top arbor toward the bottom arbor. The radial force applied by this second piston is greater than the force generated during slitting that tends to separate the arbors, and thus all radial play in the eccentric-to-machine frame bearings is eliminated.

The axial collet/piston and cylinder arrangement may be accomplished in two ways. First, a pair of collet/pistons may be mounted in the tail stock. Each piston is arranged to act between the distal end of an arbor and the angular contact bearings in which it rotates. When the cylinder is pressurized, the effect is to press axially on the bearings as if the arbor were growing lengthwise. In the alternative, a pair of cylinders can be connected between the head stock and tail stock. When these cylinders are pressurized, the effect is to draw the head stock and tail stock together, squeezing axially on the arbors Both techniques result in a relative axial load acting between the arbors and the bearings which support them, thus reducing or eliminating axial play in the bearings.

In a further embodiment, the collet/piston and cylinder arrangement in the tail stock may be double acting. Acting in one direction the collet/piston squeezes the play out of the bearings as described above. When pressurized in the opposite direction, a force is generated to separate the arbors from the collet/piston in which they are received to facilitate separation of the arbors from the tail stock.

DESCRIPTION OF PREFERRED EMBODIMENTS

Figure 1:
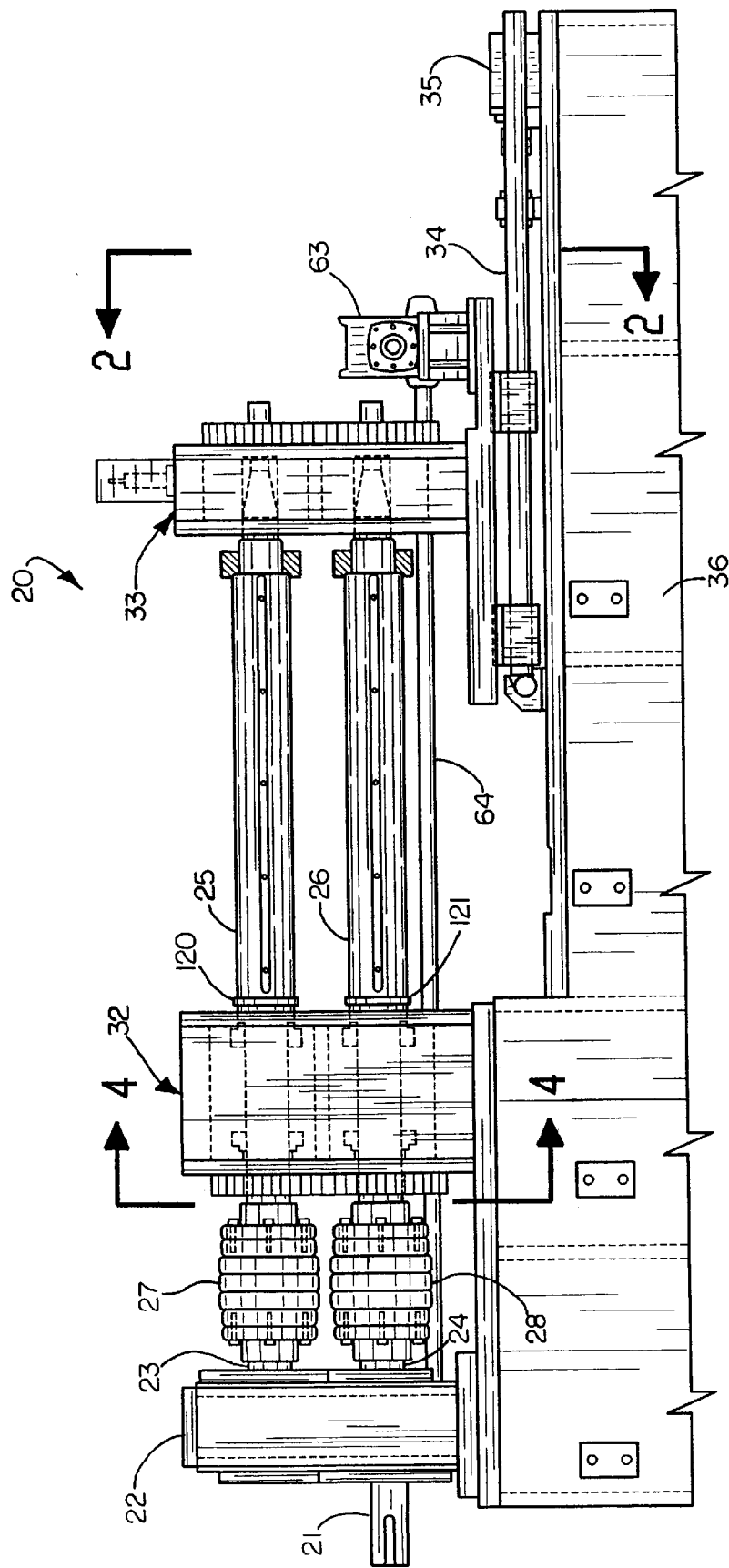
FIG. 1 is a side elevation view of a slitting machine constructed in accordance with the present invention.

FIG. 1 illustrates a slitting machine 20 constructed in accordance with the present invention. The slitting machine 20 includes an input shaft 21 which drives a gear box 22. The gear box 22 includes two output shafts 23 and 24. These two shafts in turn drive an upper arbor 25 and a lower arbor 26, respectively, through conventional couplings 27 and 28. The drive sides of the arbors 25 and 26 are supported in a head stock 32 while the opposite ends of arbors 25 and 26 are supported in a tail stock 33 located at the operator's end of the machine 20. In this specification the terms proximal and distal are used from the operator's perspective, and so the proximal ends of the arbors 25 and 26 are the ends closest to the tail stock while the distal ends are those closest to the gear box 22.

Figure 2:
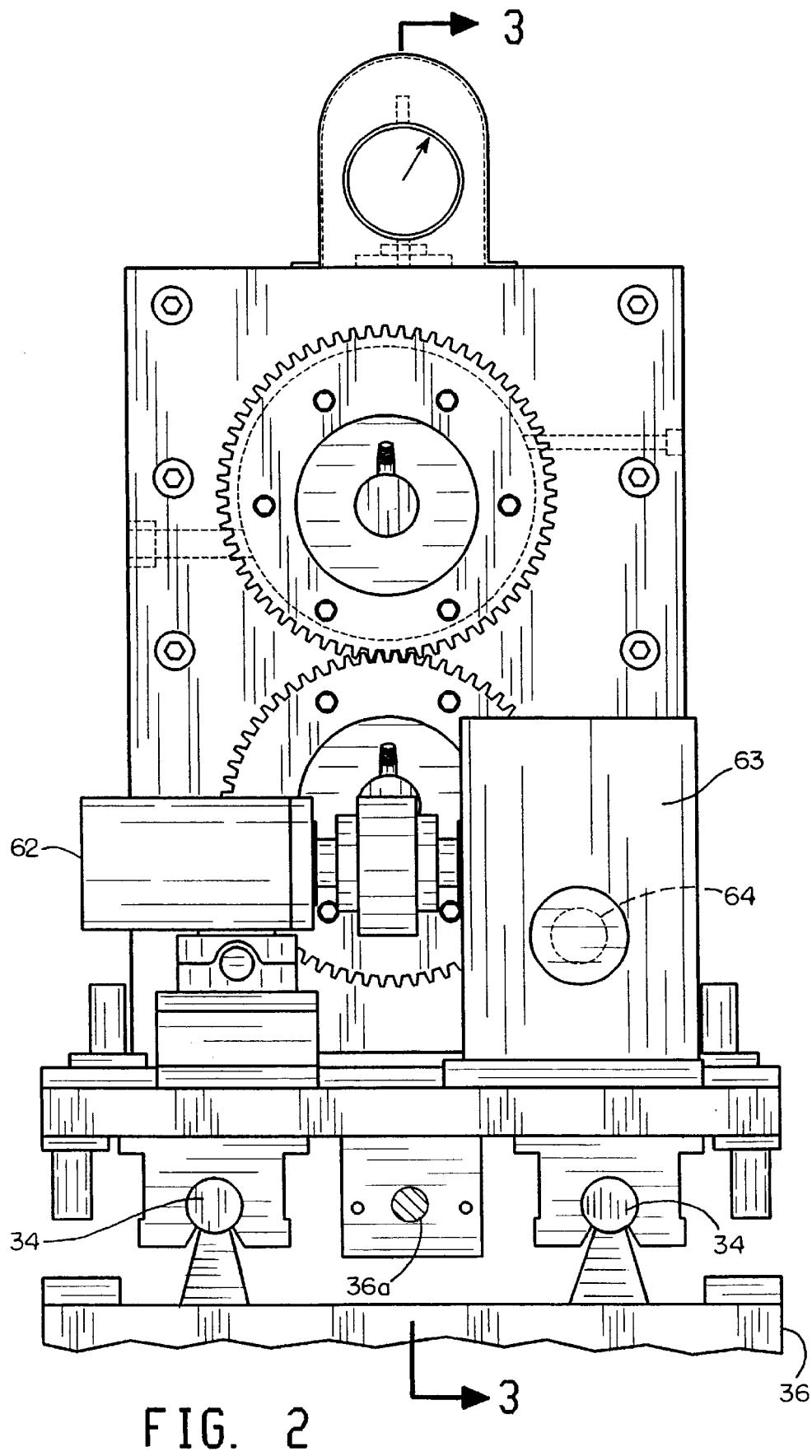
FIG. 2 is a view from the operator's end of the machine of FIG. 1, looking in the direction of arrows 2—2 of FIG. 1.

As is conventional, the tail stock 33 is slidably mounted on rails 34 to permit the tail stock to be separated from the proximal ends of the arbors 25 and 26. To this end a motor 35 is provided which drives a shaft 36a (FIG. 2) to move the tail stock 33 along the rails 34. The rails 34 are connected to the machine frame 36 to which the head stock 32 and gear box 22 are also connected.

Figure 5:
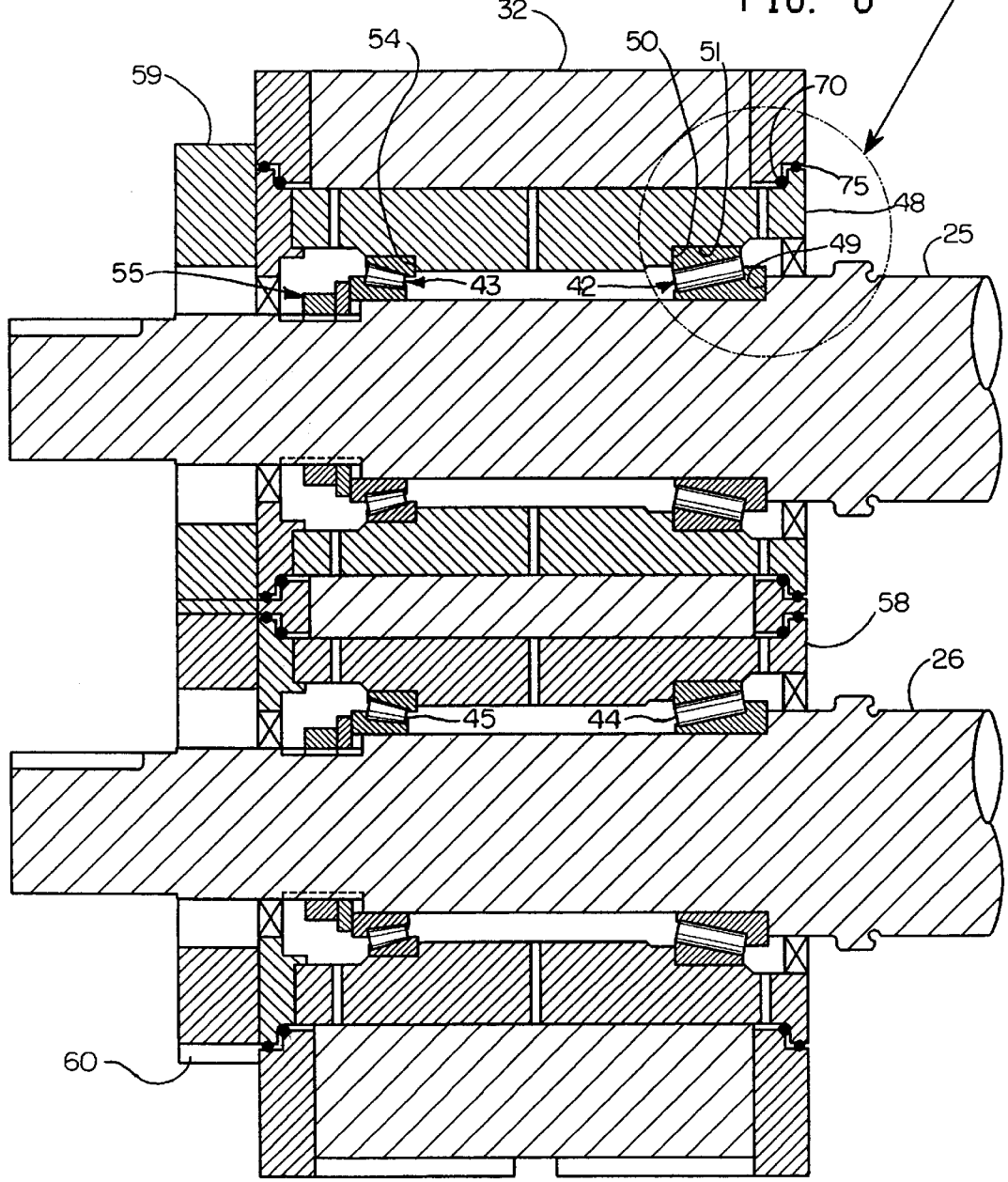
FIG. 5 is a view looking in the direction of arrows 5—5 of FIG. 4.

The arbors 25 and 26 of the slitting machine 20 (FIG. 1) are adapted to carry knives (not shown) which slit sheet material which is supplied in a web up to approximately 30 inches in width. The machine 20 is especially adapted to slit accurately thin materials such as sheet metal 0.010 inches thick, more or less. The distal portions of the arbors 25 and 26 are supported in tapered roller bearings 42, 43, 44, and 45 (FIG. 5). The proximal end portions of the upper and lower arbors 25 and 26 are similarly supported in angular contact bearings such as roller bearings in a tail stock 33, as will be discussed more fully below. In this description the term tapered roller bearing is used to mean any type of angular contact bearing. It will be understood by those skilled in the art that when an axial load is applied to an angular contact bearing, the resulting reaction forces tend to center the shaft carried by the bearing on the axis of the outer race of the bearing.

The outer race of each of the bearings 42 and 43 is carried by an eccentric 48 while the inner race of each supports the proximal end of the upper arbor 25. Specifically, the upper arbor 25 includes a shoulder 49 which extends radially to transfer axial forces to the inner race of bearing 42. Radial forces from the arbor 25 are transmitted through the cylindrical outside surface of the arbor 25 to the inner race of the bearing 42.

Both axial and radial forces which are applied to bearing 42 are transmitted to the eccentric 48. The outer race of the bearing 42 is supported in the eccentric 48 against axial forces by an annular shoulder 50. Radial force is transmitted through a cylindrical mating surface 51. The shoulders 49 and 50 face in opposite directions so that an axial thrust (to the left as shown in FIG. 5) applied from the arbor 25 is transmitted from the annular shoulder 49 on the arbor through the bearing 42 to the annular shoulder 50 in the eccentric 48.

The bearing 43 is also positioned between the arbor 25 and eccentric 48. The eccentric 48 includes an annular shoulder 54 which faces the opposite direction from annular shoulder 50 and which engages an annular end face of the outer race of the bearing 43. The inner race of the bearing 43 fits snugly around the shaft 25 and is held in place by a washer and lock nut assembly 55. By tightening the lock nut, the required amount of axial and radial play in the bearings 42 and 43 can be achieved.

Tapered roller bearings 44 and 45 are mounted in generally the same fashion as the tapered roller bearings 42 and 43, as shown in FIG. 5, and further description is not believed necessary. It is noted, however, that tapered roller bearings 44 and 45 support the distal end of the lower arbor 26 for rotation inside an eccentric 58.

Figure 4:
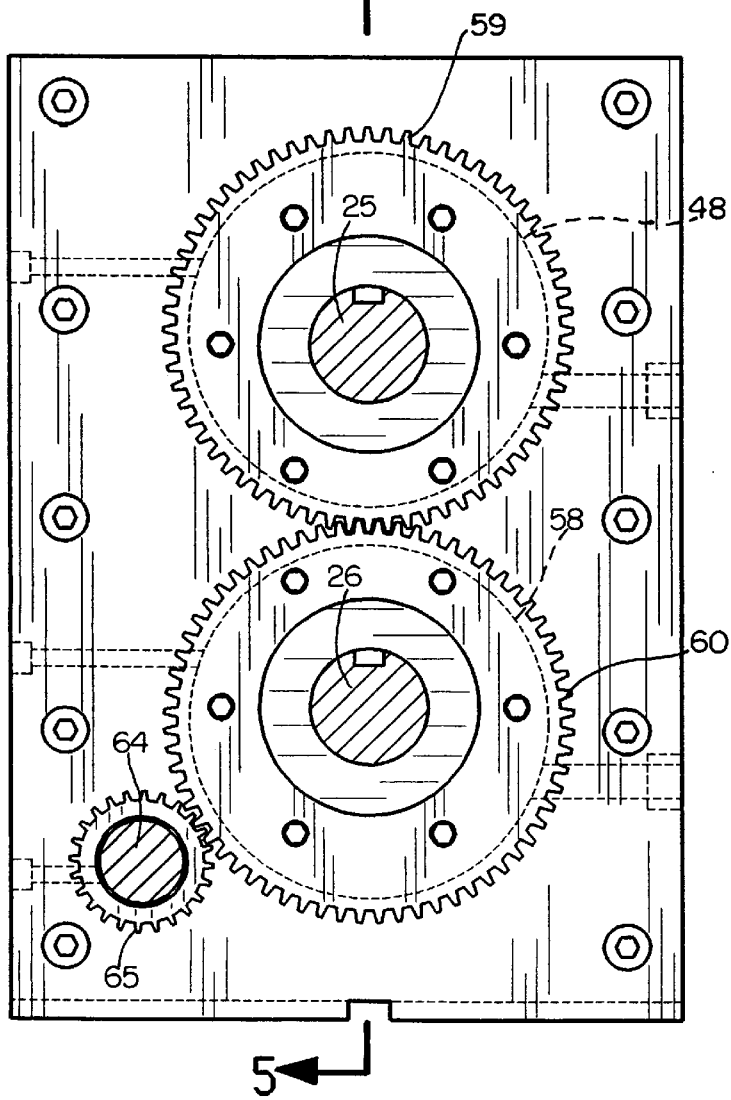
FIG. 4 is a view looking in the direction of arrows 4—4 of FIG. 1.

As is conventional, the eccentrics 48 and 58 each are connected with a spur gear 59 and 60, respectively, which mesh with each other so that rotation of the eccentrics occurs in unison. In this regard, the machine 20 is provided with a motor 62 (FIG. 2) which, through gear box 63 drives shaft 64 which in turn carries a gear 65 (FIG. 4) which engages the spur gear 60 to rotate the eccentrics 48 and 58. As is conventional, rotation of the eccentrics 48 and 58 (and the similar eccentrics in the tail stock 33) causes the arbors 25 and 26 to move toward or away from each other while maintaining their axes parallel. This permits the installation or removal of knives from the arbors 25 and 26 without having the knives on one arbor interfere with the other knives and also permits adjustment of the extent of overlap between the knives, all as is well known in the art.

Figure 6:
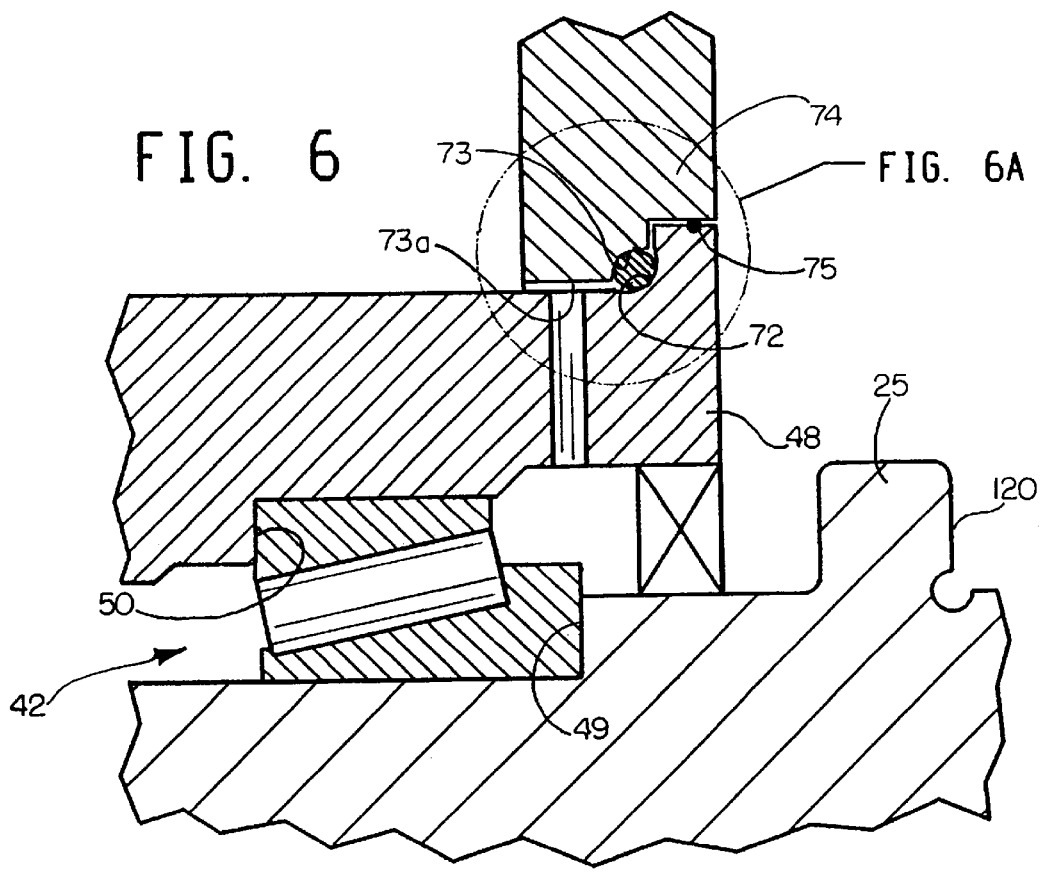
FIG. 6 is an enlarged view of a portion of FIG. 5.
Figure 6A:
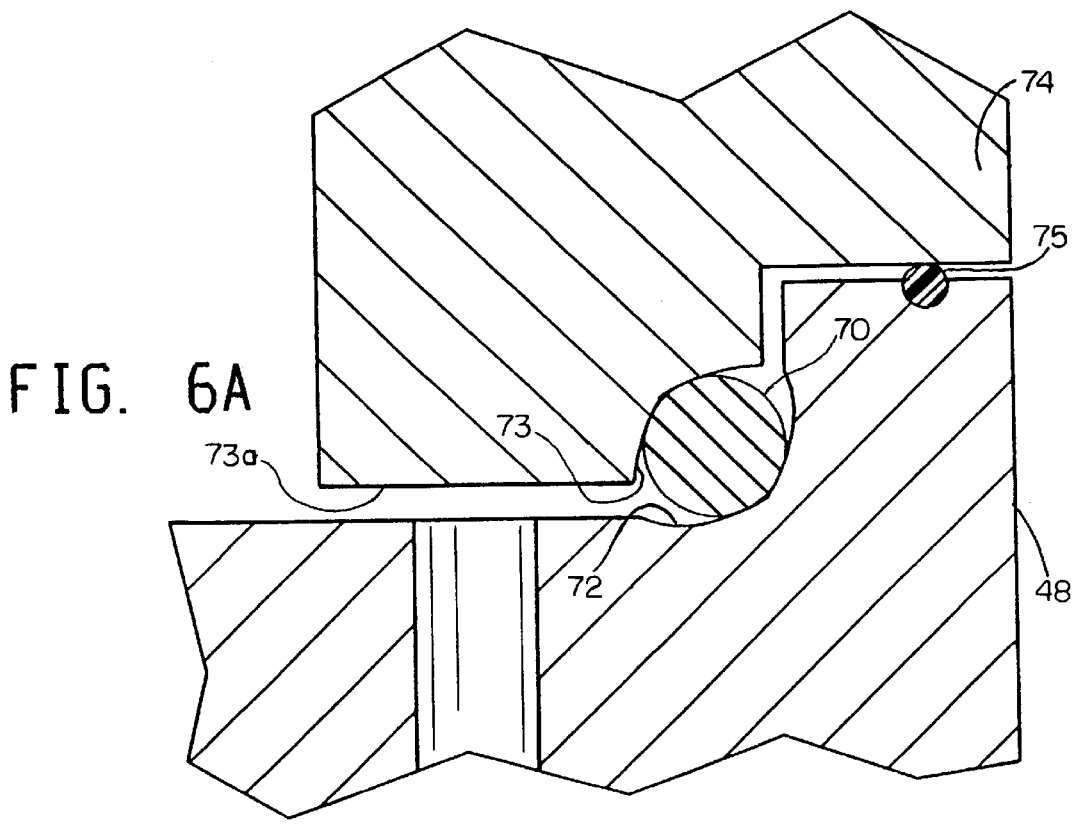
FIG. 6A is an enlarged view of a portion of FIG. 6.

The eccentrics 48 and 58 are supported for rotation in the head stock 32 by angular contact ball bearings 70 (FIGS. 5, 6 and 6A) which run on inclined arcuate races. Specifically, as illustrated in FIGS. 6 and 6A, the eccentric 48 includes an arcuate race 72 which faces an opposing arcuate race 73 which is fastened to the head stock 32. Each of the races 72 and 73 has a doubly curved surface which is larger in radius than the radius of the ball bearings 70 so that there is, theoretically, double point contact between each of the balls 70 and the races 72 and 73 as shown most clearly in FIG. 6A. A rubber O-ring 75 may be provided between the outer race 74 and the eccentric 48 to keep contaminants out and lubricants in. The races 72 and 73 face each other and are symmetrical about a cone which has a 45° angle at its apex and is centered on the axis of the bore 73a in the head stock 32 in which the eccentric 48 rotates.

The two bearing surfaces 72 and 73 are each composed of two arcuate surfaces shaped to contact the ball 70 at 22½° and 67½°, respectively, from an axis parallel to the axes of the arbors 25 and 26. The bearing surfaces 72 and 73 are thus symmetrical around a 45° cone centered about the axis of rotation of arbor. Because of this angular relationship, when an axial load is transmitted from the arbor 25 to the eccentric 48, the eccentric 48 in turn transmits the load to the head stock 32. Moreover, any play or looseness which might exist between the ball 70 and the bearing surfaces 72 and 73 is eliminated by applying an appropriate axial load to the arbor 25. The play which is eliminated by the application of an axial load is both radial and circumferential. Thus applying an axial load (toward the left) as viewed in FIGS. 1, 5, 6 and 6A on the arbor 25 serves to accurately position the eccentric 48 with respect to the head stock 32, and also, because of the tapered roller bearings 42, to accurately position the arbor 25 with respect to the eccentric 48.

The ball bearings 70 are located at the right side (as viewed in FIG. 5) of the head stock 32 and support the arbor 25. Similar ball bearings and races support the arbor 25 in the left side of the head stock 32 and also the lower arbor 26 at both the right and left sides of the head stock 32. Because all of these bearing arrangements are similar, no further description is believed necessary.

Figure 3:
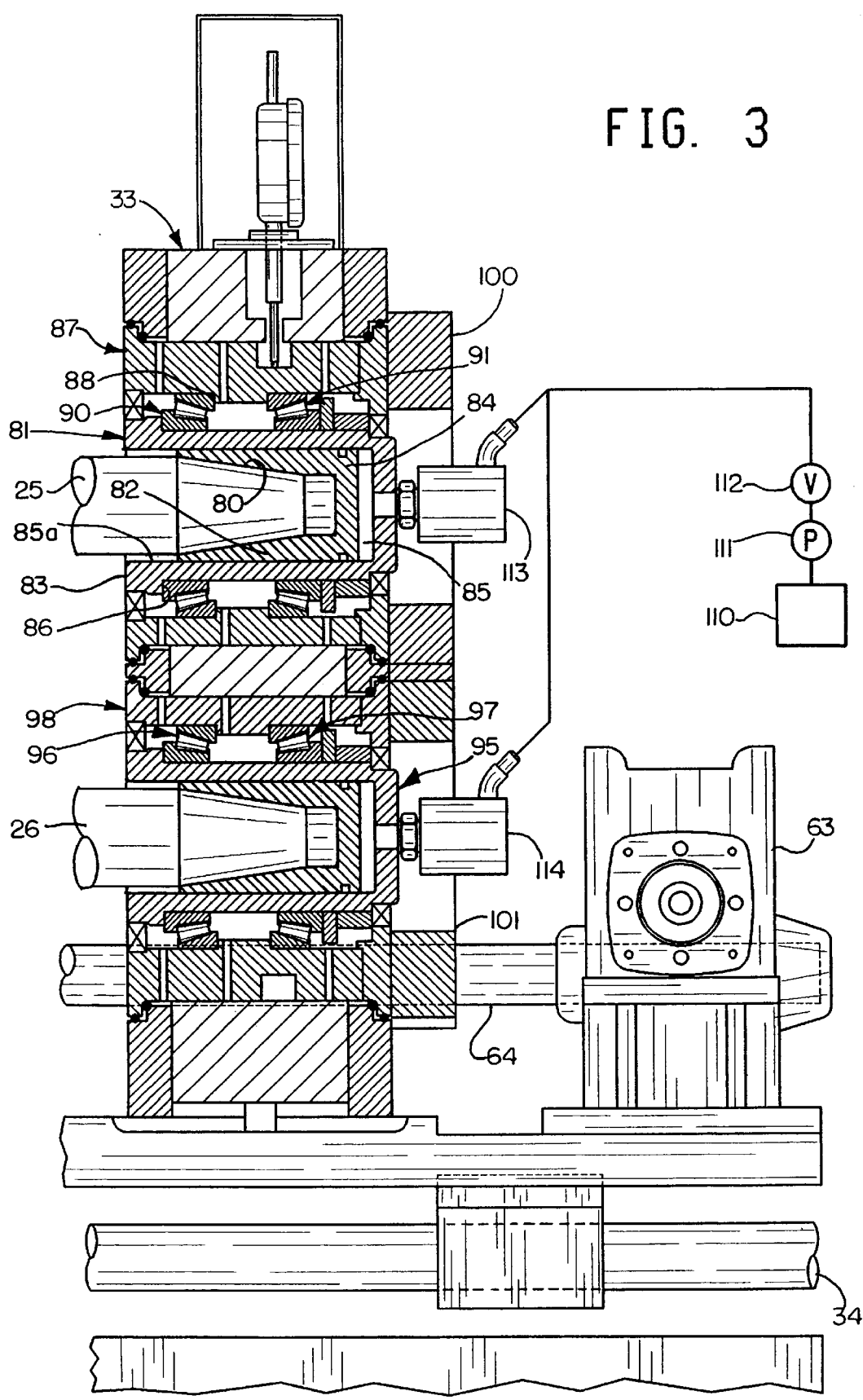
FIG. 3 is a section view looking in the direction of arrows 3—3 of FIG. 2.

The tail stock 33 is shown in cross section in FIG. 3. The two arbors 25 and 26 have their proximal ends supported in the tail stock 33. Because the support for each of the arbors 25 and 26 is substantially the same, only the mounting for the arbor 25 will be described in detail, it being understood that the same mechanism is used to support the proximal end of the arbor 26.

Figure 3A:
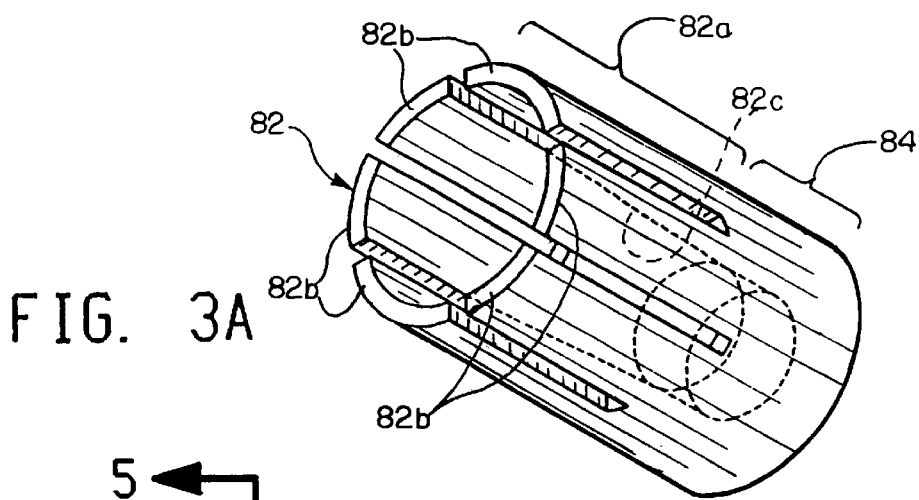
FIG. 3A is an enlarged perspective illustration of a collet/piston shown in FIG. 3.

The proximal end of arbor 25 is formed in a taper 80. The taper 80 is received in a collet/piston and cylinder assembly 81, the purpose of which is to apply an axial load between the arbor 25 and tail stock 33 so as to accurately center all the components, as will be discussed below. The collet/piston 82 of the collet/piston and cylinder assembly 81 includes a collet portion 82a (FIG. 3A) with an internal taper 82c matching the taper 80 on the proximal end of the arbor 25. Although shown as a single unit, the collet/piston 82 could be formed of two pieces, with the collet portion 82a being one piece and the piston portion 84 being another piece.

The exterior of the collet/piston 82 is cylindrical and is received within a cylinder 83 The proximal end of the collet/piston 82 is cylindrical and slides within cylinder 83. The collet portion 82a of the collet/piston 82 is formed with slits which form six fingers 82b. When hydraulic fluid pressure is applied to the cavity 85 between the piston 84 and cylinder 83, the collet/piston 82 is pushed toward the left (as illustrated in FIG. 3), and this causes the fingers 82b to press outwardly (because of the action of the taper 80) against the internal bore 85a of cylinder 83, and this in turn assures that the collet/piston 82 and arbor 25 are centered accurately in the cylinder 83.

The collet/piston and cylinder assembly 81 is mounted to rotate freely about its longitudinal axis by tapered roller bearings 90 and 91. The inner race of the tapered roller bearing 90 abuts a shoulder 86 formed in the left side of the exterior surface of cylinder 83 (as viewed in FIG. 3). Thus axial forces tending to push the cylinder 83 to the right are transmitted through the shoulder 86 to the outer race of the tapered roller bearing 90. The outer race of the tapered roller bearing 90 is mounted inside eccentric 87. The eccentric 87 in turn has a leftward facing annular shoulder 88 which abuts an annular face of the outer race of the tapered roller bearing 90 and receives axial forces which tend to push the tapered roller bearing 90 toward the right, as viewed in FIG. 3. The eccentric 87 is rotatably mounted in the tail stock 33 through the use of ball bearings and races which are identical in structure and function to those illustrated in FIG. 6 supporting the eccentrics 48 and 58.

The lower arbor 26 is supported by a collet/piston and cylinder assembly 95, tapered roller bearings 96 and 97, and eccentric 98 which are similar to those corresponding components supporting the proximal end of the upper arbor 25 and require no further description. The eccentric 98 is mounted for rotation in the tail stock 33 by means of ball bearings similar in structure and function to those which support the eccentric 48 in the head stock 32.

Each of the eccentrics 87 and 98 is connected to a spur gear 100 and 101, respectively. These gears, in turn, are driven by a spur gear (not shown) which is connected to shaft 64. It will be recalled that shaft 64 also drives through gear 65 (FIG. 4) spur gears 60 and 59 which are connected to the eccentrics 58 and 48, respectively. Accordingly, when shaft 64 turns, the eccentrics mounting both ends of both arbors rotate to move the arbors 25 and 26 toward and away from each other.

The slitting machine 20 also includes a supply of hydraulic fluid under pressure shown schematically in FIG. 3 as a reservoir 110, a pump 111 and a valve 112. The supply of hydraulic fluid under pressure is fed through conduits to conventional rotary couplings 113 and 114. These couplings are in turn connected to the collet/piston and cylinder assembly 81 supporting the proximal end of the upper arbor 25 and the collet/piston and cylinder assembly 95 supporting the proximal end of the lower arbor 26, respectively. The rotary couplings 113 and 114 allow the collet/piston and cylinder assembly to which each is connected to rotate as the arbors 25 and 26 turn while still supplying hydraulic fluid under pressure.

When the valve 112 is opened to supply fluid under pressure to the piston and cylinder assemblies 81 and 95, an axial force is applied which tends to press the arbors 25 and 26 toward the left as viewed in FIG. 3 and to press the tail stock 33 toward the right as viewed in FIG. 3. The consequence of applying this axial pressure is that all play in the tapered roller bearings which support both ends of the arbors 25 and 26 and in the ball bearings which support the eccentrics 48, 58, 87 and 91 in the head stock and tail stock 32 and 33 is eliminated, and the arbors 25 and 26 are precisely located. Specifically, each arbor is forced through the taper of the tapered roller bearings which support it to be coaxial with the bore through the eccentric in which it is mounted, and the eccentric, in turn, is forced because of the arrangement of ball bearings and races to be concentric with the outer race (e.g., 74) fastened to the head stock 32 and the corresponding race fastened to the tail stock 33. In addition, the application of a known, controlled pressure to the collet/piston and cylinder assemblies 81 and 95 (FIG. 3) results in a controlled preload on the bearings supporting the upper and lower arbors 25 and 26, and accordingly, permits reliable and repeatable axial location of the two arbors with respect to the head stock 32. As a consequence, the shoulders 120 and 121 (FIGS. 1 and 5) on the upper arbor 25 and lower arbor 26, respectively, are accurately positioned with respect to one another, and so the knives which must be stacked on the arbors and whose locations are controlled by the position of the shoulders 120 and 121, are accurately and repeatably located.

There are a number of variations and alternate techniques which may be used for carrying out the present invention.

Figure 7:
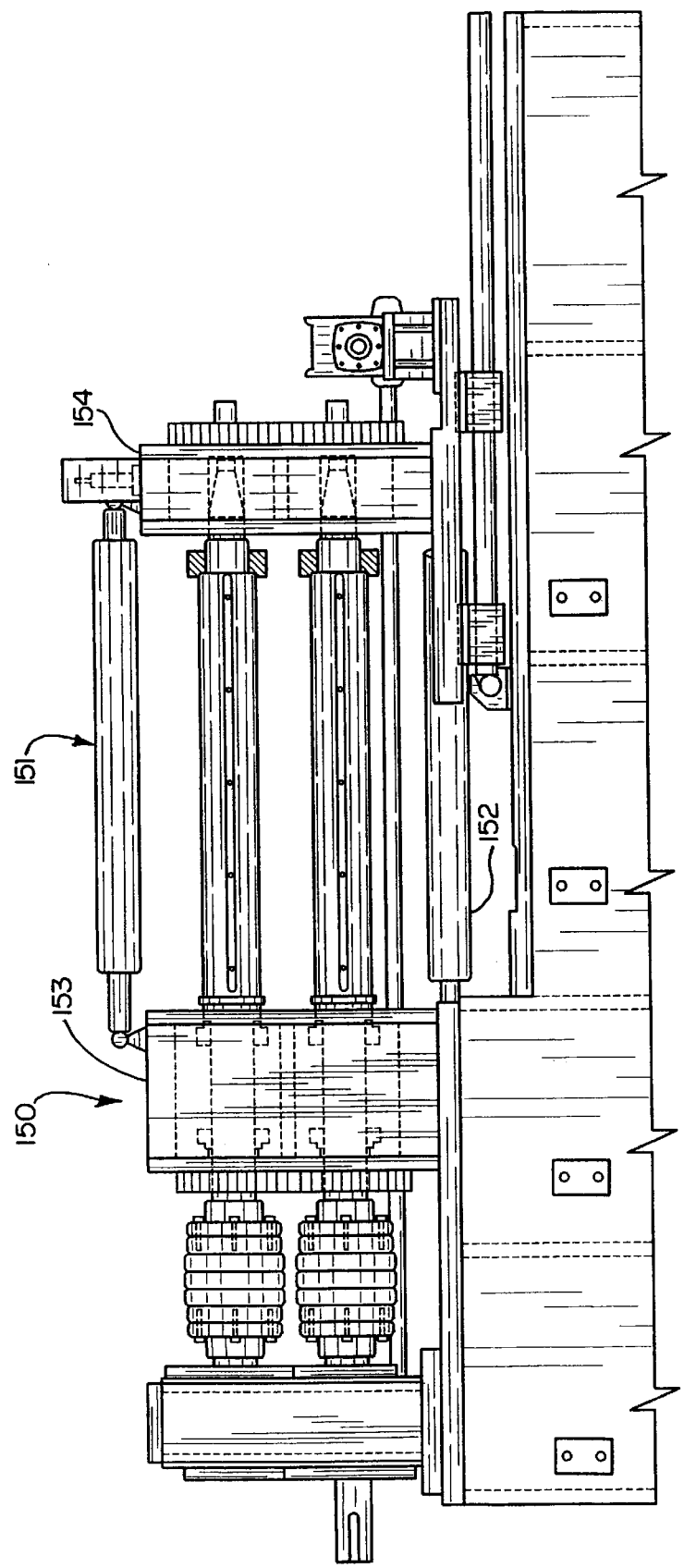
FIG. 7 is a side elevation view of a second embodiment of the present invention.

For example, FIG. 7 illustrates a slitting machine 150 which is generally similar to the slitting machine 20 shown in FIG. 1. However, the slitting machine 150 does not include the hydraulic collet/piston and cylinder assemblies 81 and 95 (FIG. 3) to provide an axial load on the arbor supporting bearings. Instead, the slitting machine 150 uses a pair of hydraulic cylinders 151 and 152 which extend between the head stock 153 and tail stock 154.

Figure 7A:
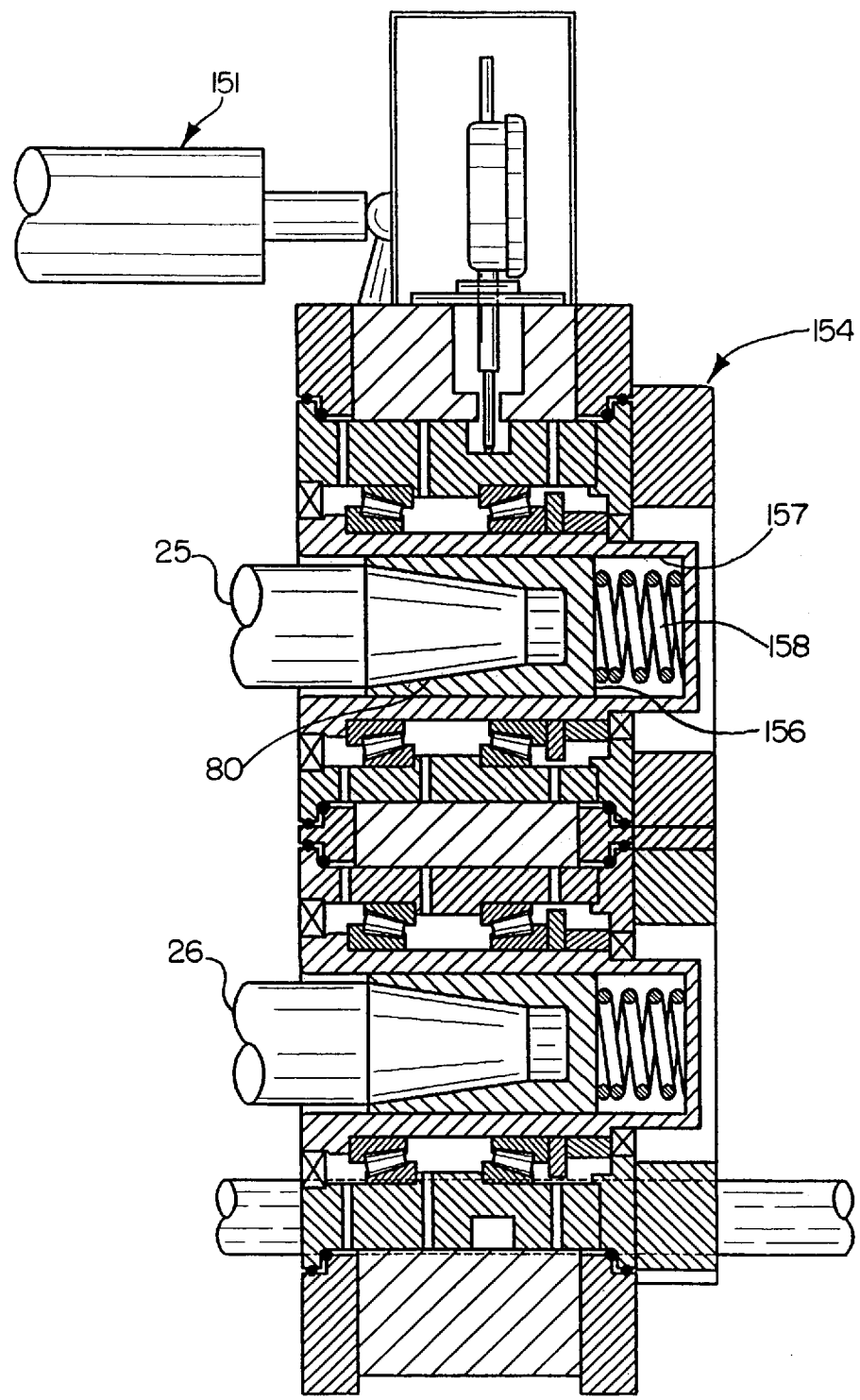
FIG. 7A shows an arbor mounting arrangement used in connection with the embodiment shown in FIG. 7.

In this embodiment the taper 80 (FIG. 7A) on the arbor 25 is received in a collet/piston 156 which slides axially in a cylinder 157. Instead of hydraulic pressure acting on collet/piston 156, a spring 158 acts between the cylinder 157 and the collet/piston 156. The cylinder 157 is rotatably mounted in the tail stock 154 in the same manner as described above in connection with the embodiment of FIGS. 1–6. The proximal end of the lower arbor 26 is mounted in a similar fashion, as can be seen in FIG. 7A.

When hydraulic pressure is applied to the cylinders 151 and 152 (FIG. 7), the head stock 153 and tail stock 154 are drawn toward each other with a predetermined force controlled by the fluid pressure. This force in turn applies an axial load to the tapered roller bearings and ball bearings in which the arbors and eccentrics are mounted.

In this embodiment, the springs 158 transmit the axial load instead of the hydraulic system illustrated in FIG. 3. As the load is applied through springs 158 to collet/piston 156, the fingers of the collet are spread slightly into engagement with the internal bore of cylinder 157 so as to accurately center the arbor 25 within the cylinder 157. The tail stock 154 is drawn into position by cylinders 151 and 152 in FIG. 7, and the springs supply an axial load which eliminates play in the various bearings and serves to locate accurately the arbors 25 and 26 in the same manner that the hydraulic pressure does in the embodiment illustrated in FIG. 3. Instead of the hydraulic cylinders 151 and 152, mechanical screws could be used to the same effect.

Figure 8:
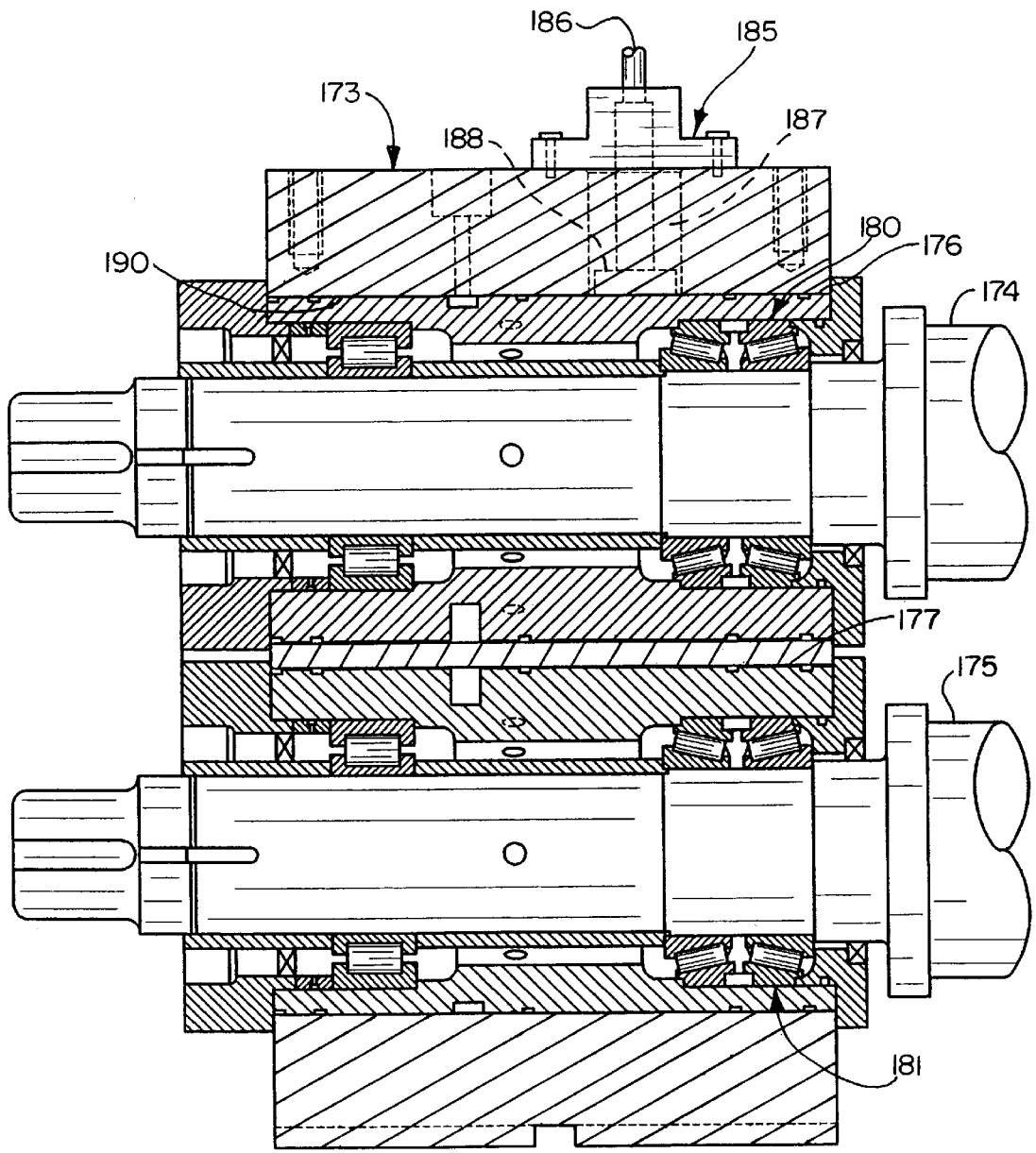
FIG. 8 is a view generally similar to FIG. 5 illustrating a portion of another embodiment of the present invention.
Figure 9:
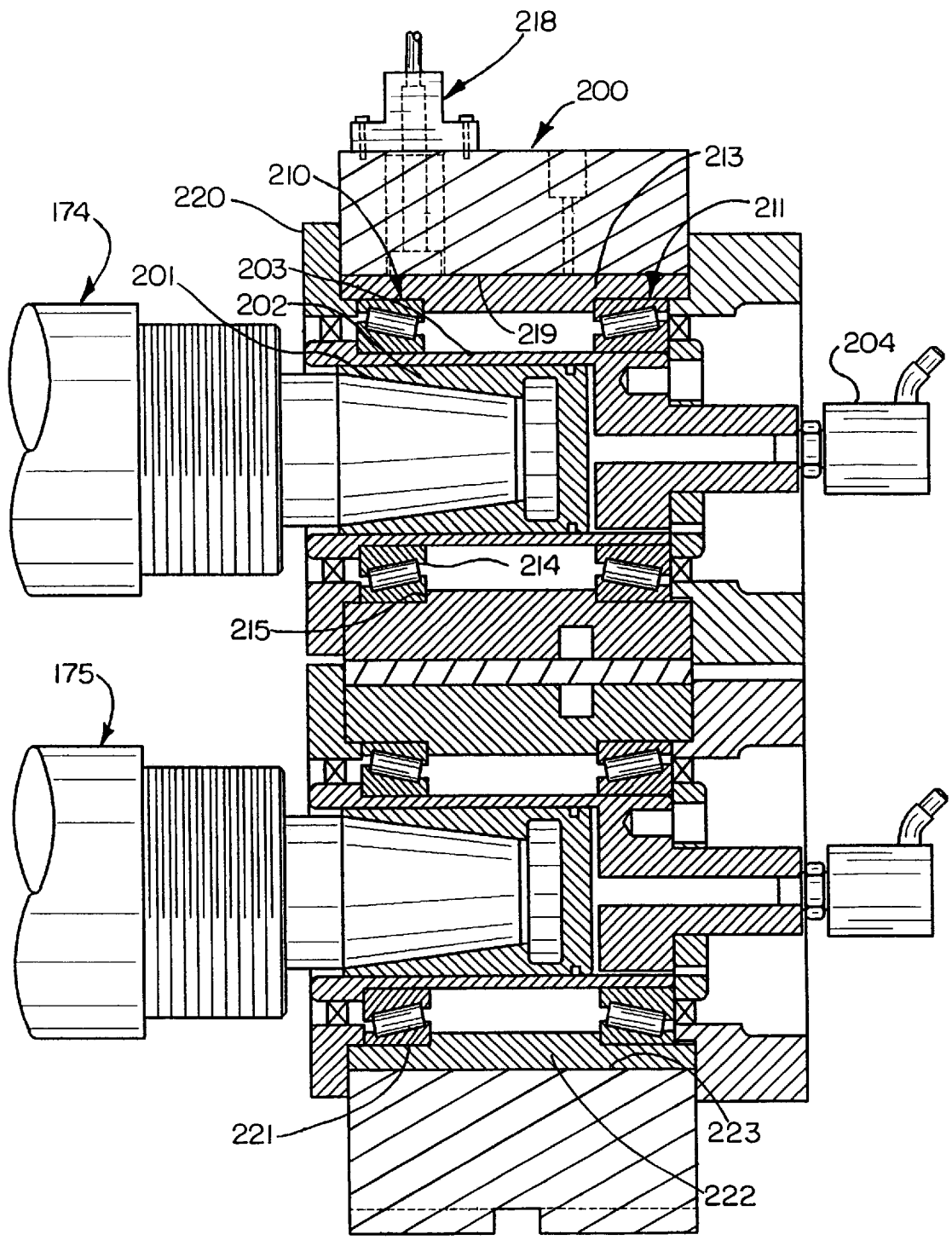
FIG. 9 is a view generally similar to FIG. 3 illustrating another portion of the embodiment of the present invention shown in FIG. 8.

Yet another embodiment of the present invention is illustrated in FIGS. 8 and 9. FIG. 8 illustrates a head stock 173 which carries an upper arbor 174 and a lower arbor 175 in eccentrics 176 and 177, respectively. Each of the arbors, 174 and 175, is mounted by means of roller bearings for rotary movement within its respective eccentric, 176, and 177. At least one set of the roller bearings, 180 and 181 are angular contact bearings such as tapered roller bearings so that when an axial load is placed on the arbors 174 and 175, the respective arbors are centered within the outer race of the bearings.

The embodiment illustrated in FIGS. 8 and 9 differs from that described previously in that the eccentrics 176 and 177 turn in plane bearings in the head stock 173. In other words the ball bearing and race arrangement illustrated in FIG. 6 is absent from the embodiment illustrated in FIGS. 8 and 9.

In the head stock 173 a hydraulic cylinder and piston assembly 185 is mounted above the eccentric 176 and secured to the head stock 173. When pressure is applied through conduit 186, the piston 187 moves downward (as illustrated in FIG. 8) and presses a bearing block 188 against the outside surface of eccentric 176. As a result, the eccentric 176 is pressed downward in bore 190 through the head stock 173 through which the eccentric extends. Thus application of pressure to the piston and cylinder assembly 185 moves the eccentric 176 downward and eliminates any vertical play which may exist between the eccentric 176 and the bore 190 through the head stock 173. This has the result of accurately positioning the upper arbor 174 with respect to the head stock 173.

It should be noted that the weight of the arbor 175 combined with the cutting forces acting between the arbors forces the eccentric 177 to the bottom of the opening in which it rotates in the head stock 173. Accordingly, there is no need for a cylinder and piston assembly to position the eccentric 177 in which the lower arbor 175 is mounted.

The proximal ends of arbors 174 and 175 are supported to tail stock 200 (FIG. 9). The end portion of the lower arbor 175 is supported in a manner similar to that supporting the end portion of the upper arbor 174, and consequently only the support of the end portion of the upper arbor 174 will be described in detail.

The upper arbor 174 terminates in a tapered end portion 201. This tapered end portion is received in a correspondingly tapered collet/piston 202 which in turn is slidably received within a cylinder 203. The arrangement is such that when hydraulic fluid under pressure is supplied through rotary coupling 204 which is connected to cylinder 203, the collet/piston 202 is pressed leftward (as viewed in FIG. 9) and an axial force is applied to the arbor 174. As described above, this causes the fingers of the collet/piston 202 to be pressed outward, centering the arbor 174 with respect to the cylinder 203.

As in the other previously described embodiments, the cylinder 203 is rotatably supported by tapered roller bearings 210 and 211 inside an eccentric 213. Shoulders 214 and 215 on the cylinder 203 and eccentric 213, respectively, transmit axial forces through the tapered roller bearing.

A piston and cylinder assembly 218 is mounted on the top of the tail stock 200 to apply a downward force on the upper arbor 174. This has the effect of precisely locating the eccentric 213 in the bore 219 in the tail stock in which the eccentric 213 rotates. When an axial load is applied between the arbor 174 and the eccentric 213 through the application of hydraulic pressure to coupling 204, all axial and radial play between the arbor and the eccentric is eliminated (through the action of tapered roller bearings 210). In addition, the axial play between the eccentric 213 and the tail stock 200 is eliminated. This later "tightening" is achieved because the eccentric 213 includes a face plate 220 which is securely connected to the eccentric and bears against the tail stock 200. The hydraulic piston and cylinder assembly 218 is similar in structure and function to the piston and cylinder assembly 185 shown in FIG. 8. When pressure is applied both to fitting 204 and to piston and cylinder assembly 218, all the axial and radial play between the upper arbor 174 and the tail stock 200 is eliminated.

The lower arbor 175 is mounted in tapered roller bearings 221, just as the upper arbor 174 is mounted. However, no piston and cylinder assembly analogous to piston and cylinder assembly 218 is required for the lower arbor 175. The reason for this is that the gravitational force and the cutting force (when the slitter is in operation) both tend to press the lower eccentric 222 to the bottom of the cylindrical opening 223 in which it is mounted, and therefore the radial position of the lower eccentric 222 is constant.

Figure 10:
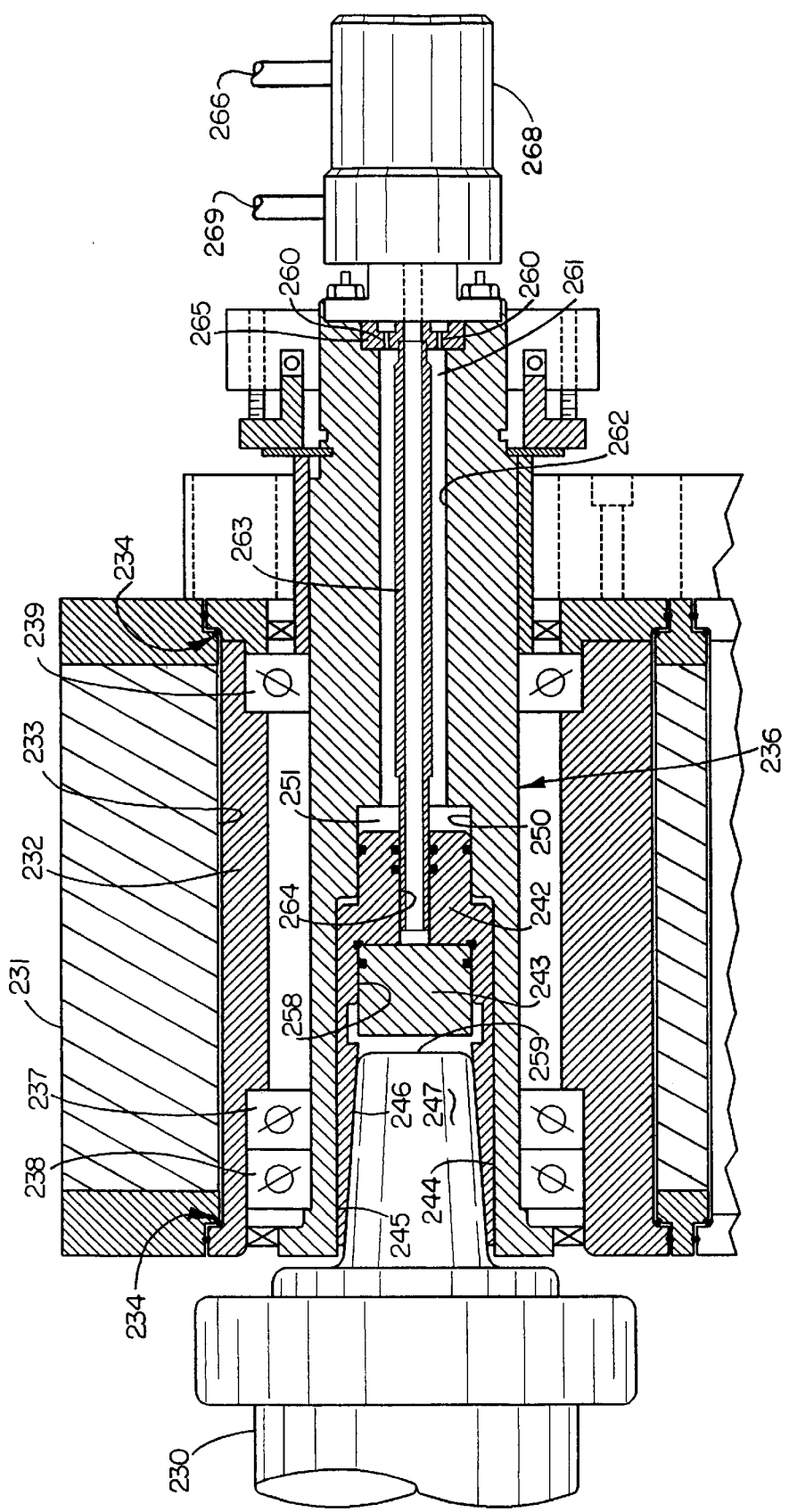
FIG. 10 is a view generally similar to FIG. 9 showing yet another embodiment of the present invention.

FIG. 10 illustrates a portion of the tail stock of another embodiment of the present invention. In FIG. 10 only the upper arbor 230 and its mounting in the tail stock 231 is shown in detail. The tail stock 231 includes an eccentric 232 which is mounted for rotation in bore 233 by a ball bearing arrangement 234 like that illustrated in FIG. 6.

A sleeve assembly 236 is rotatably mounted inside the eccentric 232. The sleeve assembly is supported by two sets of bearings, 237 and 238 at its left end (as viewed in FIG. 10) and by a single bearing 239 at its right end. The sleeve assembly 236 carries two pistons 242 and 243, one (242) to apply an axial load to the arbor 230 and the other (243) to help break the arbor 230 loose from the tail stock 231 when the tail stock is slid back to change knives on the machine.

The sleeve assembly 236 includes a first cylindrical bore 244. A collet/piston 245 has a cylindrical outside surface which is a sliding fit in the bore 244. The collet/piston 245 has an internal tapered bore 246 which receives the tapered end portion 247 of the arbor 230. When the collet 245 is pressed tightly onto the tapered end portion 247 of the arbor 230 the fingers of the collet/piston are stretched slightly and so pressed tightly against the bore 244. As noted/above in connection with other embodiments, this action centers the arbor 230 with respect to the sleeve assembly 236.

The bore 244 includes a reduced diameter portion 250 about midway between the bearings 237 and 239. This cylindrical portion receives the piston portion 242 of the collet/piston 245. A chamber 251 is defined by the space between the bore 250 and piston 242. When hydraulic fluid under pressure is applied to chamber 251, the piston 242 and collet 245 push against the arbor 230, and this in turn eliminates the play in bearings 234, 237 and 238, in a manner similar to that described in connection with the previous embodiments.

As noted above the sleeve assembly 236 includes a second piston 243. The piston 243 is received in a bore 258 in the collet/piston 245. When hydraulic fluid pressure is applied to the piston 243, it moves to the left as viewed in FIG. 10 and presses against the end face 259 of the arbor 230. This force tends to help separate the taper 247 on the arbor 230 from the tapered bore 246 in the collet/piston 245, and so makes the use of self locking tapers possible.

It should be noted that a self locking taper may be useful, although it is not necessary to practice the invention. With a self locking taper the arbor 230 will not spin inside the collet/piston 245, and a smaller axial load between the arbor 230 and tail stock 231 will successfully center the arbor and all the bearings. This in turn results in reduced wear. For these reasons the features of FIG. 10 may advantageously be used in the previously described embodiments as well.

Hydraulic fluid under pressure is supplied through rotary coupling 268. To move the piston 242 to the left (to load all the bearings and eliminate play) pressure is applied to conduit 269 which then flows through passages 260 into an annular space 261 between a passage 262 through the sleeve assembly 236 and a coaxial pipe 263. The annular space 261 communicates with chamber 251.

The pipe 263 is slidably received in a bore 264 in the collet 245 and secured by means of plate 265 to the sleeve assembly 236. Fluid pressure applied to inlet 266 passes through pipe 263 to move the piston 243 to the left as viewed in FIG. 10.

The lower arbor (not shown) is mounted in the same manner as the upper arbor 230. By using the dual pistons 242 and 243 both for the upper arbor 230 and a similar arrangement (not shown) for mounting the lower arbor (not shown), an axial force can be applied between the tail stock 231 and the arbors to eliminate play in the bearings. In addition, a force may be applied to help eject the tapered ends of the arbors from the collets 245 in which they are received.

What is claimed is:

1. A slitting machine adapted for slitting thin sheets of material, said machine comprising a base, a head stock mounted to the base and a tail stock mounted to the base, a pair of arbors for carrying knives to slit the sheet material fed through the machine, each of the arbors being rotatably mounted in eccentrics which are rotatable in the head stock and tail stock to move the arbors toward each other and into a slitting position and away from each other to permit installation or removal of the knives;

means for eliminating axial play between the arbors and the head stock and the arbors and the tail stock by applying an axial force from the head stock through the arbors to the tail stock, and means for eliminating radial play between the head stock and the tail stock and the respective eccentrics by applying a radial force between the head stock and the eccentrics mounted in the head stock and by applying a radial force between the tail stock and the eccentrics mounted in the tail stock.

2. The slitting machine of claim 1 wherein the arbors are mounted one above the other, and wherein the means for eliminating radial play includes a piston and cylinder mounted in the head stock and the tail stock positioned to apply a downward force on the eccentrics which support the upper arbor.

3. The machine of claim 1 further including angular contact bearings supporting the arbors in the eccentrics, and plane bearings supporting the eccentrics in the head stock and tail stock.

4. The machine of claim 1 wherein the means for eliminating radial play includes a piston and cylinder associated with the head stock and a piston and cylinder associated with the tail stock and positioned to apply a radial force to plane bearings supporting the eccentrics.

5. The slitting machine of claim 1 wherein the means for eliminating axial play includes a piston and cylinder acting between the head stock and the tail stock to draw them together.

6. The slitting machine of claim 5 wherein the arbors each have a longitudinal axis, the axes of the arbors lie in a plane and including a pair of pistons and cylinders acting between the head stock and the tail stock and acting in the plane defined by the axes of the arbors.

7. The machine of claim 1 wherein the means for eliminating axial play includes at least one piston and cylinder acting on the arbors to provide an axial load, the arbors each having a tapered end portion and the piston including a collet proportioned to engage the tapered end of each of the arbors, and wherein the tapered end portion of each of the arbors is self locking.

8. The machine of claim 7 wherein the at least one piston and cylinder is double acting so as to apply selectively either a compressive load to center the arbors or a tensile load to separate the collet from the arbor.

9. The machine of claim 7 wherein the means for eliminating axial play includes two pistons and cylinders, one associated with each arbor, each of the pistons having a collet portion adapted to receive the tapered end portion of a respective one of the arbors, and a supply of hydraulic fluid under pressure to the cylinders to force the pistons axially out of the cylinders.

10. The machine of claim 7 wherein the means for eliminating axial play includes two pistons and cylinders, one associated with each arbor, each of the pistons having a collet portion adapted to receive the tapered end portion of a respective one of the arbors, and a spring positioned respective of the pistons and cylinders to force the pistons axially out of the cylinders.

11. The machine of claim 1 wherein the arbors each have a longitudinal axis and the means for eliminating radial play includes opposed pairs of bearing surfaces on the eccentrics and the head stock and tail stock, the bearing surfaces being inclined with respect to the longitudinal axes of the arbors.

12. The machine of claim 11 where in the means for eliminating axial play includes a collet/piston and cylinder disposed between the arbor and the eccentric in which it is mounted, and a supply of fluid under pressure connected to the piston and cylinder.

13. The machine of claim 11 wherein the means for eliminating axial play includes a spring disposed between the arbor and the eccentric in which it is mounted.

14. The machine of claim 11 wherein the means for eliminating axial play includes screws extending between the head stock and the tail stock.

15. The machine of claim 11 wherein the means for eliminating axial play includes a collet/piston with back off piston and cylinder disposed between the arbor and the eccentric in which it is mounted, and a supply of fluid under pressure connect through a valve to the pistons and cylinder.

16. A slitting machine having a frame, a head stock connected to the frame, a tail stock connected to the frame, eccentrics rotatably mounted in the head stock and the tail stock, the eccentrics being supported in the head stock and the tail stock by angular contact bearings between the eccentrics and the head stock and tail stock, each of the angular contact bearings having an inner race and an outer race, a pair of arbors each with a first and second end, the arbors extending between the head stock and tail stock and rotatably coupled to the inner races, and a piston and cylinder acting on the arbors to apply an axial load through the angular contact bearings to center the inner races with respect to the outer races.

17. The machine of claim 16 including a tapered portion at the second ends of each of the arbors and the piston includes a collet proportioned to engage the tapered end of each of the arbors.

18. The machine of claim 16 wherein the angular contact bearings are ball bearings having balls between the inner and outer races, and each of the inner and outer races includes a surface on which the balls roll, each such surface making contact with each ball at two points.

19. A slitting machine having a frame, a head stock connected to the frame, a tail stock connected to the frame, a pair of arbors each with first and second ends, the arbors extending between the head stock and the tail stock, a first pair of eccentrics mounted in the head stock and supporting the first ends of the arbors, a second pair of eccentrics mounted in the tail stock and supporting the second ends of the arbors, and angular contact bearings between the first pair of eccentrics and the head stock and angular contact bearings between the second pair of eccentrics and the tail stock, each of the angular contact bearings including an inner race, an outer race and rotatable elements disposed in rolling contact with the inner and outer races, the outer races of angular contact bearings which support the first ends of the arbors being integrally formed of a single piece of metal and the outer races of the angular contact bearings which support the second ends of the arbors being integrally formed of a single piece of metal.

20. The slitting machine of claim 19 wherein the tail stock is movable to separate from the second ends of the arbors to enable addition or removal of cutters from the arbors, and the second end of at least one of the arbors includes a tapered end portion, the machine further including a collet having an internal taper matching the taper of the second end of the at least one arbor and a cylindrical outside surface, a cylinder rotatably mounted in the angular contact bearings and including a bore proportioned to receive the collet, and a means for eliminating axial play between the arbors and the head and tail stocks by applying an axial load to the collet to press the collet axially onto the taper of the at least one arbor and to spread fingers of the collet against the cylinder.

21. The slitting machine of claim 19 further comprising a means for eliminating axial play which includes a piston and cylinder mounted for rotation in the angular contact bearings acting between the inner race of the bearing and the arbors.

* * * * *